United States Patent

Minagawa et al.

[11] 4,221,700
[45] Sep. 9, 1980

[54] STABILIZED POLYMER COMPOSITION

[75] Inventors: Motomobu Minagawa; Mitsuo Akutsu, both of Urawa; Hiroshi Fujiwara, Omiya; Masayuki Kashiki, Soka, all of Japan

[73] Assignee: Maruzen Oil Co., Ltd., Osaka, Japan

[21] Appl. No.: 922,144

[22] Filed: Jul. 5, 1978

[30] Foreign Application Priority Data

Jul. 4, 1977 [JP] Japan .................... 52-80065
Jul. 11, 1977 [JP] Japan .................... 52-83186

[51] Int. Cl.² .......................... C08K 5/41; C08K 5/42; C08K 5/52
[52] U.S. Cl. ............ 260/45.7 PH; 260/45.8 R; 260/45.85 H; 260/45.85 S; 260/45.95 H; 525/100; 525/107; 525/123; 525/132; 525/154; 525/165; 525/178; 525/185; 525/219
[58] Field of Search ........ 260/45.7 PH, 45.95 H, 260/45.85 H, 45.85 S, 45.8 R; 525/219, 100, 107, 123, 132, 154, 165, 178, 185

[56] References Cited

U.S. PATENT DOCUMENTS

| 2,801,980 | 8/1957 | Spacht | 525/219 |
| 3,487,044 | 12/1969 | Tholstrup | 260/45.85 S |
| 3,886,144 | 5/1975 | Beadle | 260/45.7 PH |

Primary Examiner—J. Ziegler
Attorney, Agent, or Firm—Sughrue, Rothwell, Mion, Zinn and Macpeak

[57] ABSTRACT

A stabilized synthetic polymer composition comprising
(1) 100 parts by weight of a synthetic polymer,
(2) 0.001 to 5 parts by weight of a poly(alkylated alkenylphenol) composed substantially of monomeric units represented by the following formula (I)

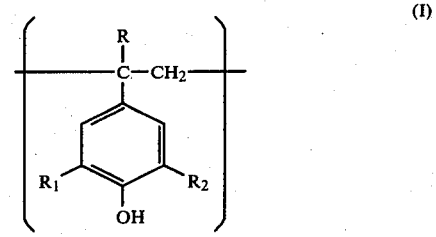

wherein R represents a hydrogen atom or an alkyl group having 1 to 4 carbon atoms; $R_1$ represents an alkyl group having 1 to 18 carbon atoms; and $R_2$ represents a hydrogen atom or an alkyl group having 1 to 18 carbon atoms; and
(3) 0.001 to 5 parts by weight of an auxiliary stabilizer selected from the group consisting of polyhydric alcohol esters of alkylthioalkanoic acids, polyesters of thiodipropionic acid and organic phosphite compounds.

26 Claims, No Drawings

STABILIZED POLYMER COMPOSITION

BACKGROUND OF THE INVENTION

1. Field of the Invention

This invention relates to a stabilized synthetic polymer composition comprising (1) a synthetic polymer, (2) as a stabilizer, a poly(alkylated alkenylphenol) of a specific formula and (3) as an auxiliary stabilizer, a specific organic sulfur compound or an organic phosphite compound.

2. Description of the Prior Art

It is known that synthetic resins such as polyethylene, polypropylene and polyvinyl chloride are susceptible to deterioration by oxygen on exposure to air or at high temperature. It is also known that this deterioration leads to a coloration of the synthetic resins or reduces their mechanical strength, and the resins become useless. Hence, a great need exists for antioxidants which protect these synthetic resins from deterioration by oxidation, and various antioxidants have been added to synthetic resins in the past. Of the antioxidants thus-far used, phenolic antioxidants such as 2,6-di-tert.-butyl-p-cresol and butylidene bis-2-tert.-butyl-5-methylphenol have a great effect, and are widely used.

However, these phenolic antioxidants have the defect that they volatilize during processing at high temperatures, are easily extracted from the resins by water, oils, etc., or color the resins. Consequently, they can be used to stabilize the resins only for short periods of time. To remedy these defects, attempts have been made to increase the molecular weight of the stabilizers, and a low-molecular-weight condensate of phenol and formaldehyde has been suggested. However, since these compounds, have a low stabilizing effect, and greatly color the resins, they are not suitable for practical applications.

British Pat. No. 971,753 discloses the addition of a poly(alkylated alkenylphenol) as an antioxidant to rubber. However, the poly(alkylated alkenylphenol) does not have a high stabilizing effect when it is added alone to rubber or a resin.

SUMMARY OF THE INVENTION

An object of this invention is to provide a stabilized synthetic polymer composition.

Another object of this invention is to provide a stabilized polymer composition highly stabilized for a long period of time.

Still another object of this invention is to provide a stabilized synthetic polymer composition including a stabilizer which volatilizes from the composition during processing at high temperatures to only a slight extent, is extracted with water, oils, etc. to only a slight extent and colors the synthetic polymer to only a slight extent. The poly(alkylated alkenylphenol) used as a stabilizer in the present invention is different from conventional antioxidants and even if the amount used thereof is reduced, an extreme reduction in stabilizing ability does not occur.

The stabilized synthetic polymer composition of the invention comprises (1) 100 parts by weight of a synthetic polymer, (2) as a stabilizer, 0.001 to 5 parts by weight, preferably 0.01 to 1 part by weight, of a poly(alkylated alkenylphenol) composed substantially of monomeric units represented by the following formula (I)

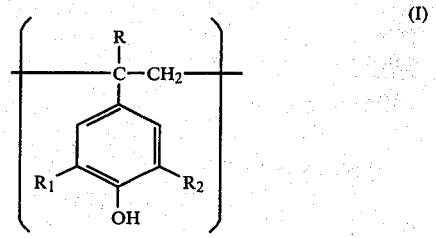

wherein R represents a hydrogen atom or an alkyl group having 1 to 4 carbon atoms; $R_1$ represents an alkyl group having 1 to 18 carbon atoms; and $R_2$ represents a hydrogen atom or an alkyl group having 1 to 18 carbon atoms; and (3) 0.001 to 5 parts by weight, preferably 0.01 to 1 part by weight, of an auxiliary stabilizer selected from the group consisting of polyhydric alcohol esters of alkylthioalkanoic acids, polyesters of thiodipropionic acid and organic phosphite compounds.

DETAILED DESCRIPTION OF THE INVENTION

Suitable polyhydric alcohol esters of alkylthioalkanoic acids which can be used as an auxiliary stabilizer (3) are those represented by the following formula (II); suitable polyesters of thiodipropionic acid which can be used as an auxiliary stabilizer (3) are represented by the following formulae (III) and (IV); and suitable organic phosphite compounds which can be used as an auxiliary stabilizer (3) are represented by the following formulae (V) and (VI).

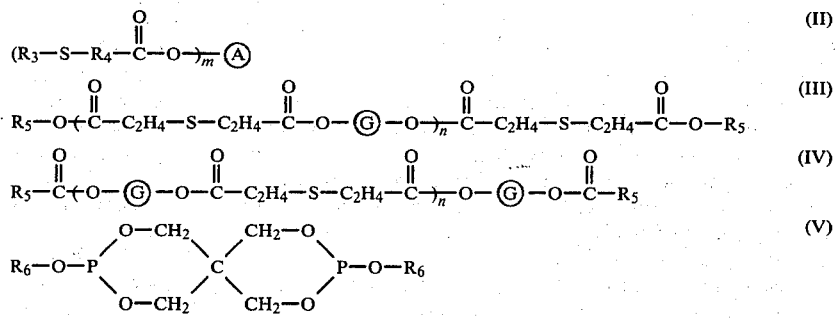

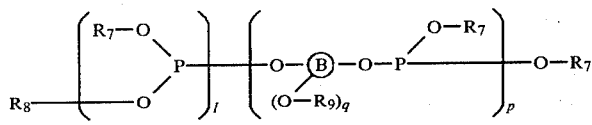

In the above general formulae (II) to (VI), $R_3$ represents an alkyl group having 1 to 30 carbon atoms; $R_4$ represents an alkylene group having 1 to 3 carbon atoms; m represents an integer of 2 to 6; Ⓐ represents a residue of a polyhydric alcohol having 2 to 6 hydroxyl groups, $R_5$ represents a hydrogen atom, an alkyl group having 1 to 18 carbon atoms, an aryl group, an alkylaryl group, an arylalkyl group or an alkylthioalkyl group; Ⓒ represents a residue of a dihydric alcohol; n represents 1 to 20; $R_6$ represents an alkyl group having 1 to 18 carbon atoms, an aryl group, an alkylaryl group, an arylalkyl group, a residue of an ethylene glycol monoether, i.e., —O—CH$_2$CH$_2$O—(hydrocarbon radical), a residue of a diethylene glycol monoether, i.e., —O—(CH$_2$CH$_2$O)$_2$(hydrocarbon radical), a polyhydric phenol residue with at least one unesterified hydroxyl group, a polyhydric phenol residue with at least one unesterified hydroxyl group of which one hydroxyl group is in the form of a phosphite ester, a polyhydric alcohol residue with at least one unesterified hydroxyl group, a polyhydric aclohol residue with at least one unesterified hydroxyl group of which one hydroxyl group is in the form of a phosphite ester, $R_7$ represents an alkyl group having 1 to 18 carbon atoms, an aryl group, an alkylaryl group, an arylalkyl group, a residue of an ethylene glycol monoether, i.e., —O—CH$_2$C-H$_2$O—(hydrocarbon radical), a residue of a diethylene glycol monoether, i.e., —O—(CH$_2$CH$_2$O)$_2$(hydrocarbon radical), a polyhydric phenol residue with at least one unesterified hydroxyl group, or a polyhydric alcohol residue with at least one unesterified hydroxyl group; $R_8$ represents the groups as defined above for $R_7$ and additionally a hydrogen atom; $R_9$ represents a hydrogen atom or a

group; Ⓑ represents a residue of a polyhydric alcohol having 2 to 6 hydroxyl groups or a residue of a polyhydric phenol having 2 to 6 hydroxyl groups; l represents 0 or 1; p represents 1 to 10; and q represents 0 to 4.

When each of the poly(alkylated alkenylphenol) and the auxiliary stabilizer is added individually to the synthetic polymer, the stabilizing effect achieved is not high. However, with the combined use of the poly(alkylated alkenylphenol) and the auxiliary stabilizer the stabilizing effect on the polymer is synergistically increased.

The compounds of the formulae (I), (II), (III), (IV), (V) and (VI) are described in greater detail below.

Examples of suitable alkyl groups having 1 to 4 carbon atoms include straight chain and branched chain alkyl groups such as methyl, ethyl, propyl, isopropyl, n-butyl, sec.-butyl, tert.-butyl and isobutyl groups. Examples of suitable alkyl groups having 1 to 18 carbon atoms include straight chain, branched chain and cyclic alkyl groups such as pentyl, hexyl, heptyl, n-octyl, iso-octyl, tert.-octyl, 2-ethylhexyl, nonyl, decyl, undecyl, dodecyl, tridecyl, tetradecyl, pentadecyl, hexadecyl, heptadecyl, octadecyl, cyclopentyl, and cyclohexyl in addition to the alkyl groups exemplified above for alkyl groups having 1 to 4 carbon atoms. Examples of suitable alkyl groups having 1 to 30 carbon atoms include straight chain, branched chain and cyclic alkyl groups such as eicosyl, docosyl, tetracosyl and triacontyl in addition to the alkyl groups exemplified above for alkyl groups having 1 to 18 carbon atoms.

Suitable examples of alkylene groups having 1 to 3 carbon atoms include methylene, ethylene and propylene groups.

Examples of suitable aryl groups are those containing 6 to 30 carbon atoms which can be monocyclic or bicyclic such as phenyl, biphenyl, and naphthyl groups.

Examples of suitable alkylaryl group are those having 7 to 30 carbon atoms in which the alkyl moiety may be straight chain or branched chain and in which the aryl moiety may be monocyclic or bicyclic such as methylphenyl, tert.-butylphenyl, cyclohexylphenyl, octylphenyl, nonylphenyl, α-butylnaphthyl, β-butylnaphthyl, α-methylnaphthyl and β-methylnapthyl groups.

Suitable examples of arylalkyl groups are those having 7 to 30 carbon atoms in which the alkyl moiety may be straight chain or branched chain and in which the aryl moiety may be monocyclic or bicyclic such as benzyl, phenylethyl, phenylpropyl, naphthylmethyl and naphthylethyl groups.

Examples of suitable residues of ethylene glycol monoethers and residues of diethylene glycol monoethers include methyl-, ethyl-, propyl-, butyl-, octyl- or phenyl-Cellosolves (C$_{3-20}$) or carbitols (C$_{5-20}$).

Examples of appropriate alkylthioalkyl groups include those having 2 to 30 carbon atoms in which the alkyl moiety may be straight chain, branched chain or cyclic, such as dodecylthioethyl and octadecylthioethyl groups.

Suitable examples of residues of dihydric alcohols and polyhydric alcohols include, for example, those of ethylene glycol, diethylene glycol, triethylene glycol, propylene glycol, dipropylene glycol, butylene glycol, pentanediol, hexanediol, decanediol, thiodiethylene glycol, neopentyl glycol, cyclohexane dimethanol, phenyl dimethanol, hydrogenated bisphenol A, 2-hydroxymethyl-2-methyl-1,3-butanediol, 3-methyl-1,3,5-pentanetriol, trimethylolpropane, trimethylolethane, glycerol, tris(2-hydroxyethyl) isocyanurate, pentaerythritol, 2,2,6,6-tetramethylolcyclohexane, 3,3,5,5-tetramethylolpyran-4-one, ditrimethylolpropane, ditrimethylolethane, sorbitol, mannitol, inositol, and dipentaerythritol.

Examples of suitable residues of polyhydric phenols are those of hydroquinone, 2,5-di-tert.-butylhydroquinone, 2,2-bis(4-hydroxyphenyl)propane, methylenebis(p-cresol), 4,4'-oxobis(3-methyl-6-isopropylphenol), 2,2'-oxobis(4-dodecylphenol), 4,4'-n-butylidenebis(2-tert.-butyl-5-methylphenol), 4,4'-benzylidene bis(2-tert-butyl-5-methylphenol), 4,4'-cyclohexylidene bis(2-tert.-butylphenol), 4,4'-thiobisphenol, 4,4'-thiobis(3-methyl-6-tert.-butylphenol), 2,2'-thiobis(4-methyl-6-tert-butylphenol), 2,2-methylenebis-[4-methyl-6-(1'-methylcyclohexyl)-phenol], 4,4'-thiobis(6-t-butyl-o-cresol), 4,4'-dihydroxybiphenyl, 2,2'-methylenebis-(4-ethyl-6-t-butylphenol), 4,4'-cyclohexylidene bisphenol, 4,4'-methylenebis(6-t-butyl-o-cresol), 4,4'-cyclohexylidenebis(2-cyclohexylphenol), 2,2'-n-butylidenebis(4,6-dimethylphenol), 3,4-di-(4-hydroxyphenyl)hexane, 4,4'-methylenebisphenol, 2,2'-methylenebis(4-methyl-6-t-butylphenol), 2,2'-n-octylidenebis(4-methylphenol), 2,2'-bis(4'-hydroxyphenyl)-heptane, 2,2'-oxobisphenol, 4,4'-oxobisphenol, 2,6-bis(2'-hydroxy-3'-tert.-butyl-5'-methylbenzyl)-4-methylphenol, 1,1,3-tris(2'-methyl-4'-hydroxy-5'-tert-butylphenyl)butane, and 2,2-bis[4,4,4',4'-tetra(4-hydroxyphenyl)cyclohexyl]propane.

A preferred molecular weight of the poly(alkylated alkenylphenol) used in this invention is about 500 to about 30,000, and from the standpoint of volatilizability, stabilizing effect and compatability with resins, molecular weights of 1,000 to 20,000 are especially preferred.

The poly(alkylated alkenylphenol) is a mono- or dialkylated product of a polymer of a alkenylphenol of the general formula (VII)

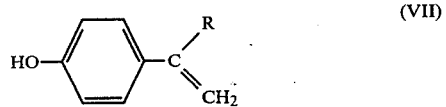

(VII)

wherein R represents a hydrogen atom or a linear or branched chain alkyl group having 1 to 4 carbon atoms. Polyalkenylphenols represented by the general formula (VII) are described in U.S. Pat. No. 4,028,340, U.S. Pat. No. 4,032,513 and J. Chem. Soc., C 1968 (8) 996-9. Specific examples of polyalkenyl phenols of the general formula (VII) are polyvinylphenol (polyhydroxystyrene), poly-α-methylvinylphenol, poly-α-ethylvinylphenol, poly-α-propylvinylphenol, poly-α-isopropylvinylphenol, poly-α-n-butylvinylphenol, and poly-α-isobutylvinylphenol. The hydrolyzed products thereof, such as a polyacyloxystyrene or a polyalkoxystyrene, can also be used.

The poly(alkylated alkenylphenol) used in the present invention can be easily synthesized by a method involving alkylating the polyalkenylphenol with an alkylating agent such as ethylene, propylene or isobutylene; a method in accordance with the method disclosed in Polymer Letters Edition, vol. 14, p 463-465 (1976) which comprises polymerizing an acetylated alkylalkenylphenol and hydrolyzing the polymer obtained; or a method in accordance with the method disclosed in Makromol. Chem. 175 p. 791-810 (1974) which comprises synthesizing an alkylated alkenylphenol, and polymerizing the alkylated alkenylphenol. The first method described is especially preferred because the method is easy to conduct and the final product is obtained in good yields. More specifically, the first method comprises dispersing a polyalkenylphenol as a starting material (which can be produced by the processes described in U.S. Pat. No. 4,028,340 and U.S. Pat. No. 4,032,513) in a solvent such as benzene, toluene, etc. and bubbling an alkylating agent such as isobutylene gas, propylene gas or ethylene gas thereinto in the presence of p-toluenesulfonic acid as a catalyst at a temperature of about 40° to 150° C. for about 5 minutes to about 24 hours, preferably 1 to 12 hours to obtain the poly(alkylated alkenylphenol). A preferred amount of polyalkenylphenol present in the solvent is about 1 to 50 wt.%. A preferred amount of catalyst is about 1 to 10 wt.% based on the weight of the polyalkenylphenol.

The synthesis of the poly(alkylated alkenylphenol) used in this invention is illustrated below in greater detail by reference to the following Synthesis Example. Unless otherwise indicated herein, all parts, percents, ratios and the like are by weight.

SYNTHESIS EXAMPLE 6.2 g of poly-p-vinylphenol having a number average molecular weight of 5,000 and 0.3 g of p-toluenesulfonic acid were dispersed in 30 ml of toluene. The dispersion was heated to 70° C., and isobutylene gas was bubbled into the dispersion.

The reaction was performed for 3 hours while bubbling the isobutylene gas into the dispersion. The reaction mixture was cooled to room temperature (about 20°-30° C.), and a small amount of insoluble material was removed by filtration. The filtrate was washed with an 10 wt.% aqueous solution of sodium hydrogen carbonate, and then the toluene was distilled off. Recrystallization of the residue from ethanol-water (1:4 by volume) afforded a brown solid having a melting point of 133° C. [Stabilizer (1)].

IR analysis showed that the absorption of 830 cm$^{-1}$ of the starting material ascribable to the

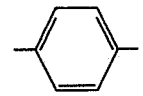

moiety disappeared, and a sharp absorption ascribable to the

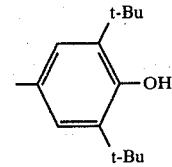

moiety appeared at 3620 cm$^{-1}$. This led to a confirmation that the two orthopositions to the hydroxyl group of the phenol ring have a tertiary butyl group. The molecular weight of the product was 9,650.

Using the same procedure as described in the Synthesis Example, the stabilizers shown in the following table were synthesized by varying the type and molecular weight of the starting polyalkenylphenol and the type of the alkylating agent used.

| Stabilizer No. | Starting Polyalkenylphenol | Molecular Weight | Alkylating Agent | Molecular Weight of Alkylated Product |
|---|---|---|---|---|
| (2) | Poly-p-vinylphenol | 550 | Isobutylene | 1,050 |
| (3) | " | 1,050 | " | 1,800 |
| (4) | " | 2,200 | " | 3,400 |
| (5) | " | 3,300 | " | 6,350 |
| (6) | " | 7,150 | " | 9,600 |
| (7) | " | 8,600 | " | 15,800 |
| (8) | " | 5,000 | Propylene | 8,450 |
| (9) | Poly-2-methyl-p-vinylphenol | 2,700 | Isobutylene | 3,800 |
| (10) | Poly-2-methyl-p-vinylphenol | 4,850 | " | 6,350 |

-continued

| Stabilizer No. | Starting Polyalkenylphenol | Molecular Weight | Alkylating Agent | Molecular Weight of Alkylated Product |
|---|---|---|---|---|
| (11) | Poly-p-isopropenylphenol | 1,600 | " | 2,900 |
| (12) | Poly-p-isopropenylphenol | 4,100 | " | 7,450 |

Examples of organic sulfur-containing compounds of the formula (II), (III) or (IV) and the organic phosphite compounds of the formula (V) or (VI) which can be used as an auxiliary stabilizer (3) together with the poly-(alkylated alkenylphenol) (2) in this invention are listed in Table 1 below.

Table 1

No. 1

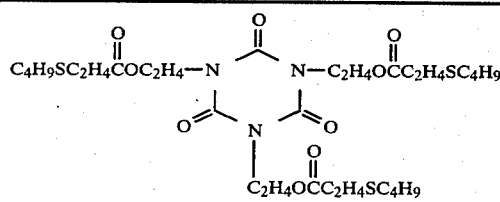

No. 2

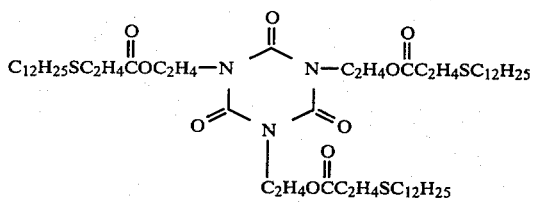

No. 3

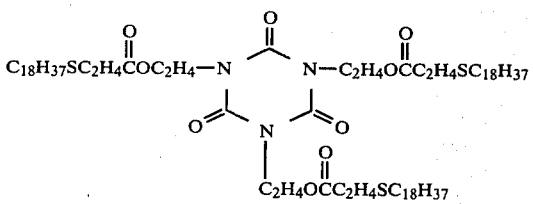

No. 4

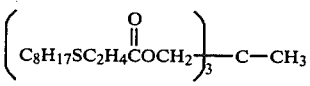

No. 5

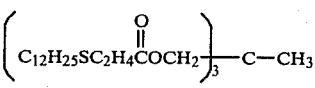

No. 6

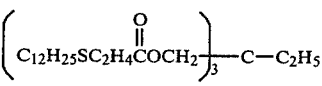

No. 7

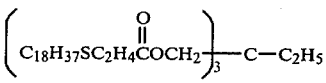

No. 8

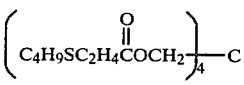

No. 9

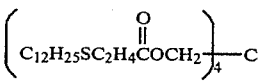

No. 10 $(C_{22}H_{45}SC_2H_4COOCH_2)_{4}C$

No. 11 $(C_{12}H_{25}SCH_2COOCH_2)_{4}C$

Table 1-continued
No. 12 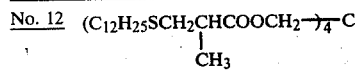
No. 13 [(C₁₂H₂₅SC₂H₄COOCH₂)₃―C―CH₂]₂O
No. 14 C₁₈H₃₇SC₂H₄COO(CH₂)₁₀OOCC₂H₄SC₁₈H₃₇
No. 15 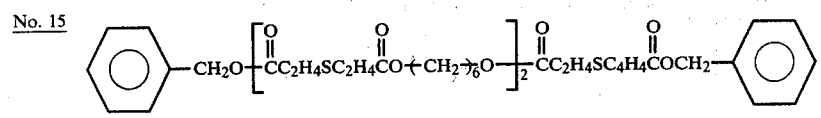
No. 16 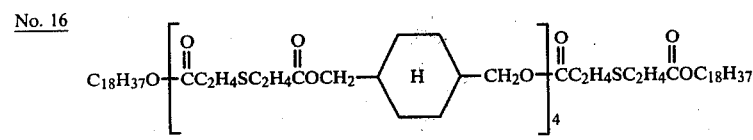
No. 17 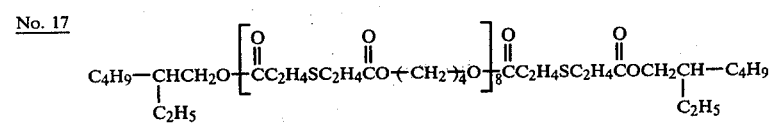
No. 18 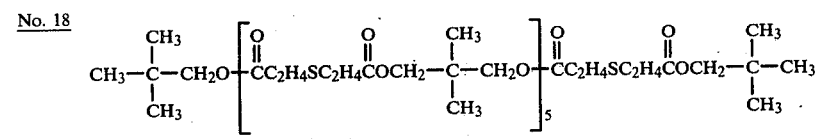
No. 19 
No. 20 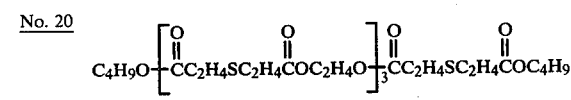
No. 21 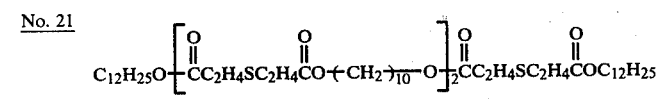
No. 22 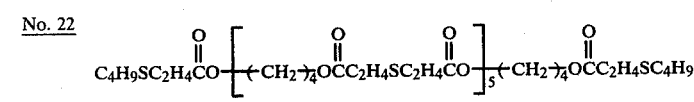
No. 23 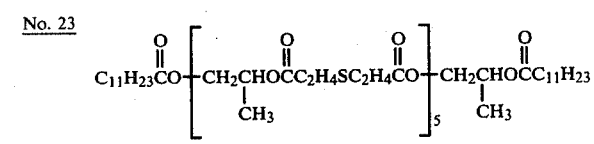
No. 24 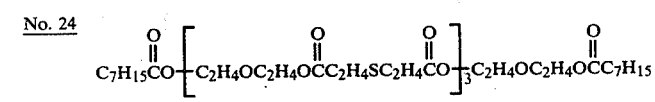
No. 25 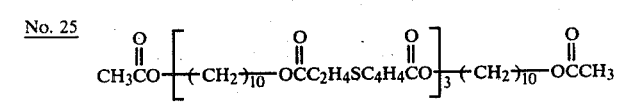
No. 26 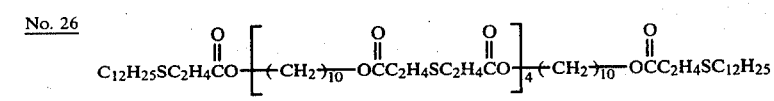

Table 1-continued
No. 27
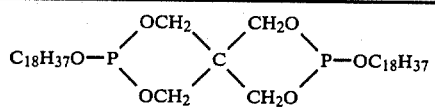
No. 28
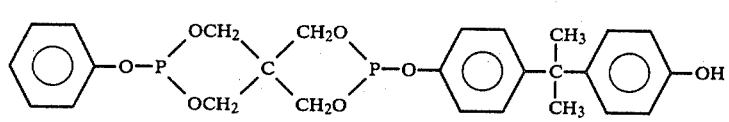
No. 29
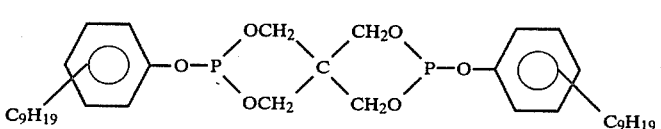
No. 30
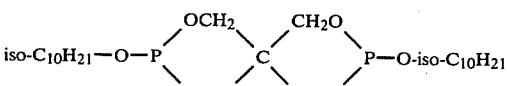
No. 31
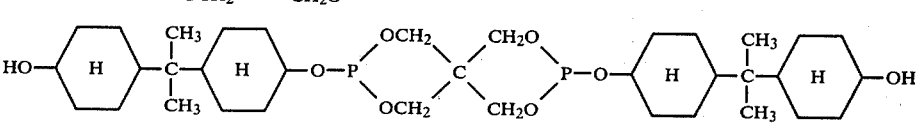
No. 32
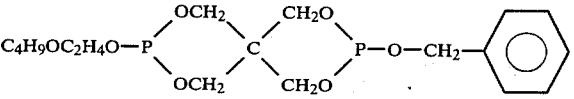
No. 33
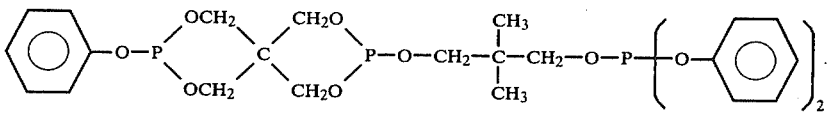
No. 34
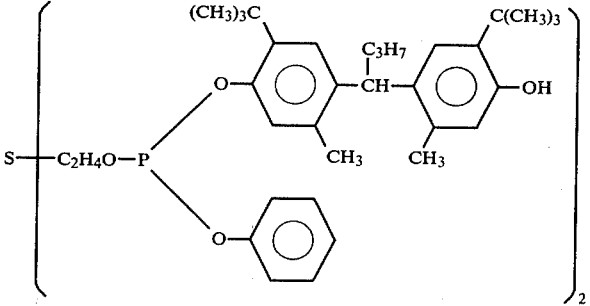
No. 35
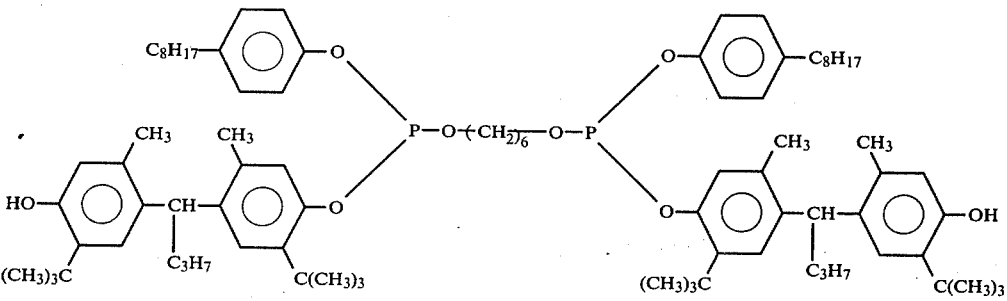
No. 36
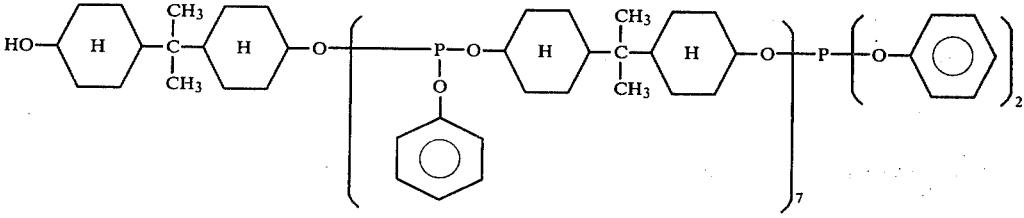

Table 1-continued
No. 37
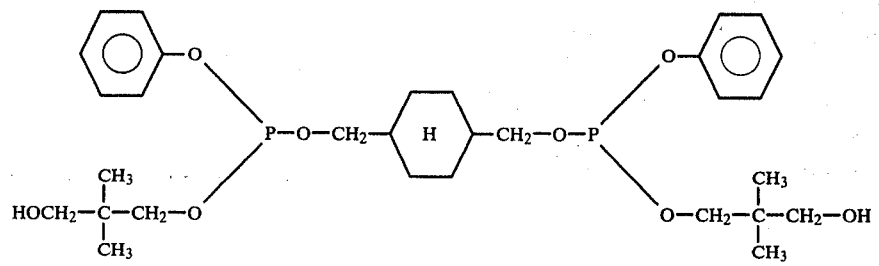
No. 38
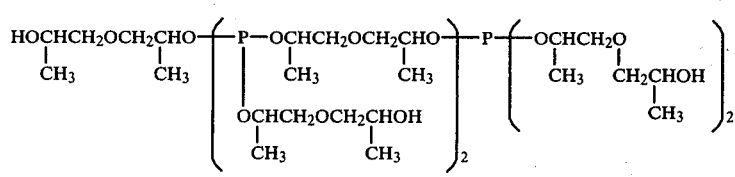
No. 39
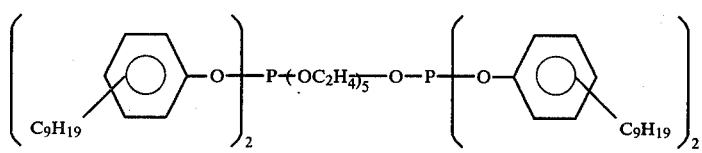
No. 40
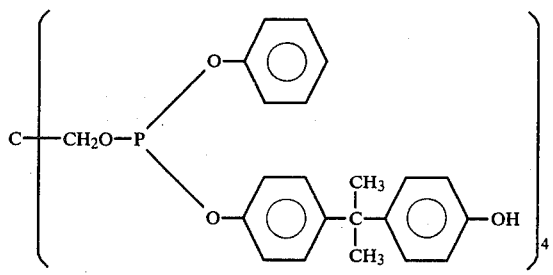
No. 41
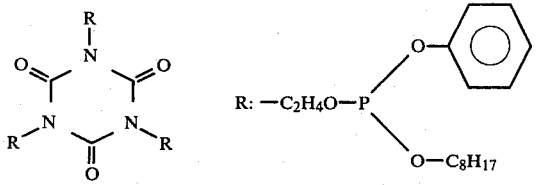
No. 42
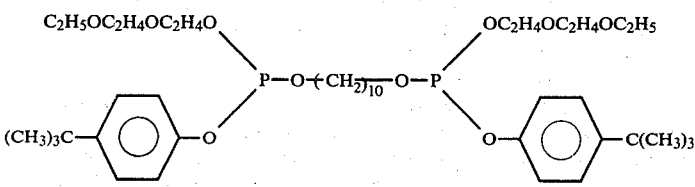
No. 43
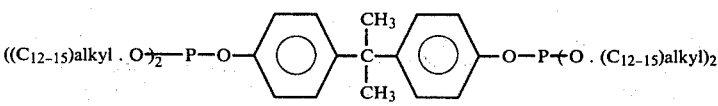
No. 44
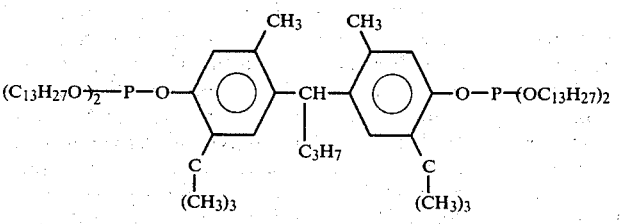
No. 45
$(C_{13}H_{27}O)_2$—P—O—
(methylenebis(substituted phenyl) structure with $CH_3$, $C_3H_7$, $C(CH_3)_3$ substituents)
—O—P—$(OC_{13}H_{27})_2$ Table 1-continued No. 46

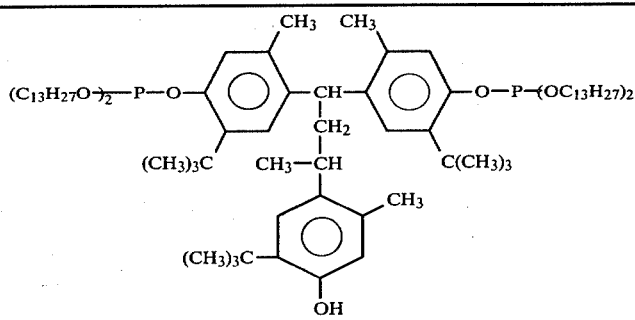

No. 47

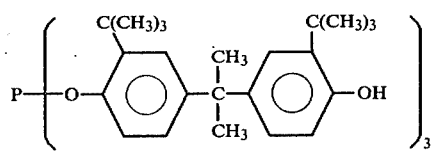

No. 48

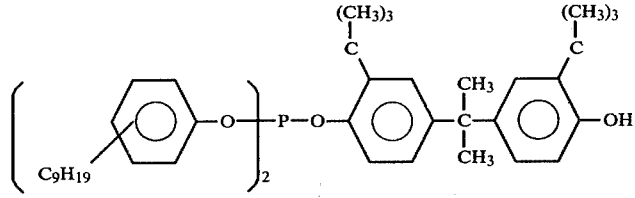

Examples of synthetic polymers that can be stabilized by the present invention include synthetic polymers of ethylenically unsaturated monomers, for example, polyolefins and olefin copolymers such as polyethylene, polypropylene, polybutene, poly-3-methylbutene and other α-olefin polymers, ethylene/vinyl acetate copolymers and ethylene/propylene copolymers, halogen-containing synthetic polymers such as polyvinyl chloride, polyvinyl bromide, polyvinyl fluoride, polyvinylidene chloride, chlorinated polyethylene, chlorinated polypropylene, polyvinylidene fluoride, brominated polyethylene, chlorinated rubbers, vinyl chloride/vinyl acetate copolymers, vinyl chloride/ethylene copolymers, vinyl chloride/propylene copolymers, vinyl chloride/styrene copolymers, vinyl chloride/isobutylene copolymers, vinyl chloride/vinylidene chloride copolymers, vinyl chloride/styrene/maleic anhydride terpolymers, vinyl chloride/styrene/acrylonitrile terpolymers, vinyl chloride/butadiene copolymers, vinyl chloride/isoprene copolymers, vinyl chloride/chlorinated propylene copolymers, vinyl chloride/vinylidene chloride/vinyl acetate terpolymers, vinyl chloride/acrylate copolymers, vinyl chloride/maleate copolymers, vinyl chloride/methacrylate copolymers, vinyl chloride/acrylonitrile copolymers, and internally plasticized polyvinyl chloride; polystyrene; polyvinyl acetate; acrylic resins; copolymers of styrene with other monomers (such as maleic anhydride, butadiene, or acrylonitrile); acrylonitrile/butadiene/styrene copolymers; acrylate/butadiene/styrene copolymers, methacrylate resins such as methacrylate/butadiene/styrene copolymers or polymethyl methacrylate; polyvinyl alcohol; polyvinyl formal; and polyvinyl butyral. Linear polyesters, polyamides, polycarbonates, polyacetals, polyurethanes, cellulosic resins, phenolic resins, urea resins, melamine resins, epoxy resins, unsaturated polyester resins, and silicone resins can also be stabilized by this invention. Rubbers such as isoprene rubber, butadiene rubber, acrylonitrile/butadiene copolymer rubbers or styrene/butadiene copolymer rubbers, and blends of the polymers described above can also be stabilized in accordance with this invention.

The synthetic polymers that can be stabilized by the present invention also include crosslinked polymers such as crosslinked polyethylene prepared by crosslinking with peroxides or ionizing radiation, and foamed polymers such as foamed polystyrene prepared by foaming with blowing agents. A suitable molecular weight range for the stabilized synthetic polymer of this invention is about 1,000 to about 1,000,000, preferably 10,000 to 500,000.

The oxidation stability of the polymer composition of this invention can be improved further by employing other phenolic antioxidants in addition. A suitable amount thereof is about 0.001 to about 5 parts by weight per 100 parts by weight of the synthetic polymer. Suitable examples of other phenolic antioxidants which can be used include phenols such as 2,6-di-tert.-butyl-p-cresol, stearyl-(3,5-dimethyl-4-hydroxybenzyl)thioglycolate, stearyl-β-(4-hydroxy-3,5-di-tert.-butylphenyl)propionate, distearyl-3,5-di-tert.-butyl-4-hydroxybenzylphosphonate, 2,4,6-tris(3',5'-di-tert.-butyl-4'-hydroxybenzylthio)-1,3,5-triazine, distearyl(4-hydroxy-3-methyl-5-tert-butyl)benzylmalonate, 2,2'-methylenebis(4-methyl-6-tert.-butylphenol), 4,4'-methylenebis(2,6-di-tert.-butylphenol), 2,2'-methylenebis[6-(1-methylcyclohexyl)-p-cresol], bis[3,3-bis(4-hydroxy-3-tert.-butylphenyl)butyric acid] glycol ester, 4,4'-butylidenebis(6-tert.-butyl-m-cresol), 1,1,3-tris(2-methyl-4-hydroxy-5-tert.-butylphenyl)butane, 1,3,5-tris(3,5-di-tert.-butyl-4-hydroxybenzyl)-2,4,6-trimethylbenzene, tetrakis[methylene-3-(3,5-di-tert.-butyl-4-hydroxyphenyl)propionate]methane, 1,3,5-tris(3,5-di-tert.-butyl-4-hydroxybenzyl)isocyanurate, 1,3,5-tris[(3,5-di-tert.-butyl-4-hydroxyphenyl)propionyloxyethyl]isocyanurate, 2-octylthio-4,6-di(4-hydroxy-3,5-di-tert.-butyl)phenoxy-1,3,5-triazine, and 4,4'-thiobis(6-tert.-butyl-m-cresol); and carbonic acid oligo-esters of polyhydric phenols such as a carbonic acid oligo-ester of 4,4'-butylidenebis(2-tert-butyl-5-methylphenol) (with a degree of polymerization of, for example, 2, 3, 4, 5, 6, 7, 8, 9, 10).

Another sulfur-containing antioxidant may also be employed in the polymer composition of this invention to improve the oxidation stability thereof further. A suitable amount thereof is about 0.001 to about 5 parts by weight per 100 parts by weight of the synthetic polymer. Examples of other sulfur-containing antioxidants which can be used are dilauryl-, dimyristyl- and distearyl-thiodipropionates.

Another phosphite compound may also be employed in the polymer composition of this invention to improve the light and heat resistance of the polymer composition. A suitable amount of thereof is about 0.001 to about 5 parts by weight per 100 parts by weight of the synthetic polymer. Examples of other phosphite compounds which can be used include trioctyl phosphite, trilauryl phosphite, tridecyl phosphite, octyldiphenyl phosphite, triphenyl phosphite, tris(butoxyethyl) phosphite, tris(nonylphenyl) phosphite, distearyl pentaerythritol diphosphite, tetra(tridecyl)-1,1,3-tris(2-methyl-5-tert.-butyl-4-hydroxyphenyl)butane diphosphite, tetra($C_{12-15}$ mixed alkyl)-4,4'-isopropylidenediphenyl diphosphite, tetra(tridecyl)-4,4'-butylidenebis(3-methyl-6-tert.-butylphenol) diphosphite, tris(3,5-di-tert.-butyl-4-hydroxyphenyl) phosphite, tris(mono.di-mixed nonylphenyl) phosphite, hydrogenated 4,4'-isopropylidene diphenol polyphosphite, bis(octylphenyl)-bis[4,4'-butylidenebis(3-methyl-6-tert.-butylphenol)]-1,6-hexanediol diphosphite, phenyl 4,4'-isopropylidenediphenol pentaerythritol diphosphite, tris[4,4'-isopropylidenebis(2-tert.-butylphenol)] phosphite, phenyl di-isodecyl phosphite, di(nonylphenyl) pentaerythritol diphosphite, tris(1,3-distearoyloxyisopropyl) phosphite, and 4,4'-isopropylidenebis(2-tert.-butylphenol) di(nonylphenyl) phosphite.

The light resistance of the polymer composition of this invention can be further improved by employing a light stabilizer therein. A suitable amount thereof is about 0.001 to about 5 parts by weight per 100 parts by weight of the synthetic polymer. Examples of suitable light stabilizers which can be used include hydroxybenzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles such as 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-methylphenyl)benzotriazole and 2-(2'-hydroxy-3',5'-di-t-amylphenyl)benzotriazole; benzoates such as phenylsalicylate, p-t-butylphenyl salicylate, and 2,4-di-t-butylphenyl-3,5-di-t-butyl-4-hydroxybenzoate; nickel compounds such as 2,2'-thiobis(4-t-octylphenol) nickel salt, [2,2'-thiobis(4-t-octylphenolate)] n-butylamine nickel salt, and monoethyl (3,5-di-t-butyl-4-hydroxybenzyl)phosphonate nickel salt; substituted acrylonitriles such as methyl α-cyano-β-methyl-β-(p-methoxyphenyl)acrylate; and piperidine compounds such as 2,2,6,6-tetramethyl-4-piperidinyl benzoate, bis(2,2,6,6-tetramethyl-4-piperidinyl)sebacate, tris(2,2,6,6-tetramethyl-4-piperidinyl)nitrilotriacetate and tetrakis(2,2,6,6-tetramethyl-4-piperidinyl)butanetetracarboxylate.

If desired, the polymer composition of this invention may contain additional additives. A plasticizer such as dioctyl phthalate, dioctyl adipate and tricresyl phosphate may be added in an amount of about 30 to 60 parts by weight per 100 parts by weight of the synthetic polymer. A fire retardant such as hexabromobenzene, tetrabromobisphenol A and antimony trioxide may be added in an amount of about 5 to 30 parts by weight per 100 parts by wegiht of the synthetic polymer. A metal deactivating agent such as hydrazide salicylate, oxanilide and N-salicyloyl-N'-salicylidenehydrazine, a nucleating agent such as 4-tert-butylbenzoic acid, adipic acid and diphenylacetic acid, a metal soap such as calcium stearate, zinc stearate and barium stearate, an organic tin compound such as dibutyltin maleate and dibutyltin dilaurate, an epoxy compound such as epoxidized fatty oils, a pigment such as carbon black, $PbCrO_4$ and $Mn_2(PO_4)_3$, a filler such as calcium carbonate and clay, a foaming agent such as sodium bicarbonate, butane, azodicarbonamide and a diisocyanate, an antistatic agent such as a cationic surface active agent, a lubricant such as montanic acid and stearic acid may be added, each in an amount of about 0.005 to 5 parts by weight per 100 parts by weight of the synthetic polymer.

In producing the stabilized polymer composition of this invention, components (1) to (3) as described can be simply mixed by kneading using, e.g., a mixing roll, at a temperature higher than the softening point of the synthetic polymer.

The following Examples are given to illustrate the present invention in more detail. The present invention should not be construed as being limited to these examples.

EXAMPLE 1

The components in each of the formulations set forth below were kneaded using a mixing roll at 180° C. for 5 minutes. The mixture was compression-molded at 180° C. and 250 kg/cm² for 5 minutes to form test samples having a thickness of 1 mm.

| Compounding Formulation (I) | parts by weight |
|---|---|
| Unstabilized Polypropylene (Melt flow index 4 g/10 min., 230° C. 2160 g JISK 6758, produced by Hercules Powder Company) | 100 |
| Calcium Stearate | 0.2 |
| Auxiliary Stabilizer (as shown in Table 2) | 0.3 |
| Phenol Compound (as shown in Table 2) | 0.1 |

| Compounding Formulation (II) | parts by weight |
|---|---|
| Unstabilized Polypropylene | 100 |
| Calcium Stearate | 0.2 |
| Dilauryl Thiodipropionate | 0.3 |
| Phenol Compound (as shown in Table 2) | 0.1 |
| Auxiliary Stabilizer (as shown in Table 2) | 0.1 |

| Compounding Formulation (III) | parts by weight |
|---|---|
| Unstabilized Polypropylene | 100 |
| Calcium Stearate | 0.2 |
| Phenol Compound (as shown in Table 2) | 0.2 |
| Auxiliary Stabilizer (as shown in Table 2) | 0.1 |

The heat stability of the test samples was evaluated in a Geer oven at 160° C. Ten test samples from the same molded article were used, and the results were expressed as the time which elapsed until at least five test pieces discolored and became waxy. The degree of yellowing (%) of the test samples after exposure to irradiation from a fluorescent lamp for 24 hours and 72 hours, respectively, was measured using a Hunter colorimeter. Test samples were also immersed for 7 days in hot water at 90° C. to evaluate heat stability. The results obtained are shown in Table 2 below.

molded at 150° C. and 180 kg/cm² for 5 minutes to form a sheet having a thickness of 1.2 mm.

Table 2

| Run No. | Phenol Compound | Auxiliary Stabilizer* | Heat Stability (hours) | Heat Stability after Immersion in Hot Water (hours) | Degree of Yellowing (%) | | |
|---|---|---|---|---|---|---|---|
| | | | | | Original | 24 Hours Later | 72 Hours Later |
| Formulation I | | | | | | | |
| *Comparative Example* | | | | | | | |
| 1-1 | 2,6-Di-t-butyl-p-cresol | Dilauryl thiodipropionate | 138 | 75 | 12.3 | 21.5 | 32.8 |
| 1-2 | 4,4'-Butylidene-bis-3-methyl-6-t-butylphenol | No. 4 | 235 | 158 | 8.5 | 13.3 | 20.5 |
| 1-3 | Stabilizer (3) | None | 132. | 120 | 10.2 | 14.1 | 21.5 |
| 1-4 | Stabilizer (6) | None | 100 | 91 | | | |
| 1-5 | None | No. 4 | 74. | 49 | 7.5 | 13.1 | 18.7 |
| 1-6 | None | No. 15 | 89 | 41 | | | |
| *Example* | | | | | | | |
| 1-1 | Stabilizer (7) | No. 1 | 366 | 337 | 6.9 | 8.6 | 9.8 |
| 1-2 | Stabilizer (6) | No. 4 | 375 | 346 | 6.8 | 8.8 | 9.9 |
| 1-3 | Stabilizer (10) | No. 6 | 350 | 322 | 7.1 | 8.9 | 9.8 |
| 1-4 | Stabilizer (1) | No. 9 | 392 | 369 | 5.8 | 7.4 | 8.4 |
| 1-5 | Stabilizer (9) | No. 13 | 363 | 332 | 7.3 | 9.2 | 10.2 |
| 1-6 | Stabilizer (4) | No. 15 | 329 | 312 | 6.4 | 8.1 | 9.3 |
| 1-7 | Stabilizer (8) | No. 17 | 340 | 323 | 8.0 | 10.0 | 10.9 |
| 1-8 | Stabilizer (2) | No. 19 | 368 | 336 | 8.5 | 10.3 | 11.4 |
| 1-9 | Stabilizer (3) | No. 22 | 377 | 349 | 8.4 | 10.3 | 11.3 |
| 1-10 | Stabilizer (12) | No. 24 | 354 | 328 | 8.8 | 10.4 | 11.5 |
| Formulation II | | | | | | | |
| *Comparative Example* | | | | | | | |
| 1-7 | 2,6-Di-t-butyl-p-cresol | Trisnonylphenyl phosphite | 212 | 127 | 10.4 | 18.0 | 23.7 |
| 1-8 | 4,4'-Butylidene-bis-3-methyl-6-tert.-butylphenol | No. 27 | 276 | 179 | 8.2 | 12.3 | 15.6 |
| 1-9 | None | No. 44 | 113 | 52 | 6.2 | 9.6 | 13.8 |
| *Example* | | | | | | | |
| 1-11 | Stabilizer (1) | No. 27 | 388 | 365 | 5.0 | 7.3 | 8.5 |
| 1-12 | Stabilizer (2) | No. 44 | 307 | 266 | 8.3 | 10.6 | 11.7 |
| 1-13 | Stabilizer (4) | No. 29 | 334 | 303 | 6.0 | 7.9 | 8.8 |
| 1-14 | Stabilizer (5) | No. 45 | 370 | 341 | 7.2 | 9.0 | 10.4 |
| 1-15 | Stabilizer (7) | No. 36 | 362 | 333 | 6.4 | 8.1 | 9.3 |
| 1-16 | Stabilizer (9) | No. 38 | 315 | 297 | 6.9 | 8.6 | 9.9 |
| Formulation III | | | | | | | |
| *Comparative Example* | | | | | | | |
| 1-10 | Stearyl-3,5-di-t-butyl-4-hydroxyphenyl propionate | No. 35 | 224 | 157 | 7.5 | 10.3 | 12.7 |
| 1-11 | Stabilizer (3) | Trisnonylphenyl phosphite | 205 | 184 | 12.3 | 15.7 | 19.6 |
| 1-12 | Stabilizer (1) | None | 96 | 83 | 15.1 | 25.0 | 38.4 |
| 1-13 | None | No. 35 | 128 | 75 | | | |
| *Example* | | | | | | | |
| 1-17 | Stabilizer (1) | No. 46 | 340 | 323 | 6.1 | 9.1 | 10.0 |
| 1-18 | Stabilizer (3) | No. 27 | 283 | 265 | 5.3 | 8.0 | 8.7 |
| 1-19 | Stabilizer (6) | No. 35 | 252 | 228 | 6.3 | 9.2 | 9.8 |
| 1-20 | Stabilizer (10) | No. 48 | 280 | 258 | 6.7 | 8.8 | 9.3 |
| 1-21 | Stabilizer (11) | No. 42 | 236 | 210 | 7.2 | 9.5 | 11.2 |

*Compounds indicated by number shown in Table 1 above (hereinafter the same)

EXAMPLE 2

The components in each of the following formulations were kneaded using a mixing roll at 150° C. for 5 minutes. The kneaded mixture was then compression-molded at 150° C. and 180 kg/cm² for 5 minutes to form a sheet having a thickness of 1.2 mm.

| Compounding Formulation (IV) | parts by weight |
|---|---|
| Polyethylene (Viscosity average molecular weight 8.5 × 10⁴ produced by Mitsui Petrochemical | |

-continued

| | |
|---|---|
| Industries Ltd.) | 100 |
| Auxiliary Stabilizer (as shown in Table 3) | 0.3 |
| Phenol Compound (as shown in Table 3) | 0.1 |

| Compounding Formulation (V) | parts by weight |
|---|---|
| Polyethylene | 100 |
| Dilauryl Thiodipropionate | 0.3 |
| Phenol Compound (as shown in Table 3) | 0.1 |
| Auxiliary Stabilizer (as shown in Table 3) | 0.05 |

Test samples having a size of 10×20 mm were cut from the sheet, and heat deterioration of the samples was evaluated using a Geer oven in air at 148.5° C. on aluminum foil. Ten test samples prepared from each sheet were used, and the time which elapsed until at least five of them discolored and became waxy was determined and is shown as the deterioration time in Table 3 below.

Table 3

| Run No. | Phenol Compound | Auxiliary Stabilizer | Deterioration Time (hours) |
|---|---|---|---|
| Formulation IV | | | |
| Comparative Example | | | |
| 2-1 | 2,6-Di-t-butyl-p-cresol | Distearyl thiodipropionate | 216 |
| 2-2 | 1,1,3-tris-(2'-Methyl-4'-hydroxy-5'-tert.-butyl-phenyl)butane | No. 5 | 285 |
| 2-3 | Stabilizer (5) | None | 241 |
| 2-4 | Stabilizer (9) | None | 225 |
| 2-5 | None | No. 20 | 213 |
| Example | | | |
| 2-1 | Stabilizer (2) | No. 2 | 482 |
| 2-2 | Stabilizer (4) | No. 5 | 475 |
| 2-3 | Stabilizer (5) | No. 9 | 504 |
| 2-4 | Stabilizer (7) | No. 12 | 488 |
| 2-5 | Stabilizer (1) | No. 16 | 463 |
| 2-6 | Stabilizer (10) | No. 20 | 455 |
| 2-7 | Stabilizer (8) | No. 23 | 471 |
| 2-8 | Stabilizer (9) | No. 27 | 497 |
| Formulation V | | | |
| Comparative Example | | | |
| 2-6 | 2,6-Di-tert.-butyl-p-cresol | No. 31 | 322 |
| Example | | | |
| 2-9 | Stabilizer (1) | No. 30 | 516 |
| 2-10 | Stabilizer (2) | No. 42 | 474 |
| 2-11 | Stabilizer (4) | No. 31 | 492 |
| 2-12 | Stabilizer (5) | No. 27 | 527 |
| 2-13 | Stabilizer (8) | No. 37 | 505 |
| 2-14 | Stabilizer (9) | No. 33 | 483 |
| 2-15 | Stabilizer (10) | No. 40 | 497 |
| 2-16 | Stabilizer (12) | No. 45 | 450 |

EXAMPLE 3

In order to demonstrate the effect of the stabilizers of this invention on polybutene, the components in each of the following formulations were kneaded using a mixing roll at 140° C. for 5 minutes. The kneaded mixture was compression-molded at 160° C. and 200 kg/cm² for 5 minutes to form a sheet having a thickness of 1 mm.

| Compounding Formulation (VI) | parts by weight |
|---|---|
| Unstabilized Polybutene (Viscosity average molecular weight 1 × 10⁶ produced by Witco Chemical Company) | 100 |
| Calcium Stearate | 1.0 |
| Phenol Compound (as shown in Table 4) | 0.2 |
| Auxiliary Stabilizer (as shown in Table 4) | 0.2 |

| Compounding Formulation (VII) | parts by weight |
|---|---|
| Unstabilized Polybutene | 100 |
| Calcium Stearate | 1.0 |
| Distearyl Thiodipropionate | 0.3 |
| Phenol Compound (as shown in Table 4) | 0.2 |
| Auxiliary Stabilizer (as shown in Table 4) | 0.2 |

The sheet was cut into samples having a size of 40×150 mm. Each of the samples was suspended in each of separate cylinders, and the time at which oxidative degradation began was measured. The results obtained are shown in Table 4.

The inside of the cylinder was maintained in an oxygen atmosphere at 1 atm. and 160° C. The oxidative degradation initiation time was the time at which the pressure of the inside of the cylinder began to decrease abruptly and which was read from a recorder.

Table 4

| Run No. | Phenol Compound | Auxiliary Stabilizer | Degradation Initiation Time (hours) |
|---|---|---|---|
| Formulation VI | | | |
| Comparative Example | | | |
| 3-1 | Stearyl-β-(3,5-di-t-butyl-4-hydroxyphenyl)propionate | Dilauryl thiodipropionate | 395 |
| 3-2 | Stabilizer (11) | None | 186 |
| Example | | | |
| 3-1 | Stabilizer (5) | No. 3 | 483 |
| 3-2 | Stabilizer (1) | No. 8 | 503 |
| 3-3 | Stabilizer (11) | No. 11 | 542 |
| 3-4 | Stabilizer (10) | No. 14 | 511 |
| 3-5 | Stabilizer (3) | No. 18 | 559 |
| 3-6 | Stabilizer (8) | No. 21 | 498 |
| 3-7 | Stabilizer (6) | No. 26 | 526 |
| Formulation VII | | | |
| Comparative Example | | | |
| 3-3 | 1,3,5-tris(3,5-Di-t-butylbenzyl)-2,4,6-trimethylbenzene | No. 32 | 371 |
| Example | | | |
| 3-8 | Stabilizer (1) | No. 34 | 583 |
| 3-9 | Stabilizer (3) | No. 43 | 512 |
| 3-10 | Stabilizer (5) | No. 28 | 566 |
| 3-11 | Stabilizer (6) | No. 39 | 527 |
| 3-12 | Stabilizer (7) | No. 32 | 535 |
| 3-13 | Stabilizer (8) | No. 27 | 550 |
| 3-14 | Stabilizer (10) | No. 41 | 507 |

EXAMPLE 4

The components indicated below were kneaded using a roll, and pressed to form a sheet having a thickness of 0.5 mm.

|  | parts by weight |
|---|---|
| ABS Resin (Heat deformation temperature 103° C., ASTM D 648 rubber content: 30 wt. %, produced by Ube Cycon Company) | 100 |
| Zinc Stearate | 0.5 |
| Phenol Compound (as shown in Table 5) | 0.1 |
| Auxiliary Stabilizer (as shown in Table 5) | 0.2 |

The sheet was heated in a Geer oven at 135° C. for 20 hours. The degree of coloration of the sheet was then measured with a Hunter colorimeter, and expressed as whiteness (%). The results obtained are shown in Table 5.

Table 5

| Run No. | Phenol Compound | Auxiliary Stabilizer | Whiteness (%) |
|---|---|---|---|
| Comparative Example | | | |
| 4-1 | None | None | 13 |
| 4-2 | Stabilizer (2) | None | 12 |
| 4-3 | Stabilizer (9) | None | 12 |
| Example | | | |
| 4-1 | Stabilizer (2) | No. 4 | 33 |
| 4-2 | Stabilizer (12) | No. 7 | 36 |
| 4-3 | Stabilizer (9) | No. 10 | 32 |
| 4-4 | Stabilizer (6) | No. 14 | 39 |
| 4-5 | Stabilizer (5) | No. 18 | 30 |
| 4-6 | Stabilizer (3) | No. 25 | 37 |
| Comparative Example | | | |
| 4-4 | Stabilizer (2) | Trilauryl phosphite | 18 |
| Example | | | |
| 4-7 | Stabilizer (2) | No. 39 | 32 |
| 4-8 | Stabilizer (4) | No. 29 | 38 |
| 4-9 | Stabilizer (6) | No. 34 | 39 |
| 4-10 | Stabilizer (7) | No. 47 | 34 |
| 4-11 | Stabilizer (8) | No. 45 | 41 |
| 4-12 | Stabilizer (9) | No. 37 | 35 |

EXAMPLE 5

100 parts by weight of polyvinyl chloride (Average degree of polymerization: 1050 Geon 103 EP, a product of Nippon Zeon Co., Ltd.), 42 parts by weight of dioctyl phthalate, 3 parts by weight of epoxidized soybean oil, 0.3 part by weight of zinc stearate, 0.5 part by weight of barium stearate, 0.3 part by weight of stearic acid, 0.1 part by weight of each of the organic sulfur compounds or 0.2 part by weight of each of the organic phosphite compounds as the auxiliary stabilizers shown in Table 6 below and 0.05 part by weight of each of the phenol compounds shown in Table 6 below were kneaded using a mixing roll at 175° C. for 5 minutes. The mixture was compression-molded at 175° C. to form a transparent sheet. The heat deterioration of the each sample was tested in a Geer oven in an air atmosphere at 190° C. The discoloration initiation time was evaluated from the degree of coloration.

The results obtained are shown in Table 6 below.

Table 6

| Run No. | Phenol Compound | Auxiliary Stabilizer | Discoloration Initiation Time (minutes) Yellowing | Discoloration Initiation Time (minutes) Blackening |
|---|---|---|---|---|
| Comparative Example | | | | |
| 5-1 | None | None | 30 | 45 |
| 5-2 | 2,6-Di-t-butyl-p-cresol | Dilauryl thiodipropionate | 45 | 55 |
| 5-3 | Stabilizer (4) | None | 44 | 55 |
| 5-4 | Stabilizer (11) | None | 48 | 59 |
| 5-5 | None | No. 2 | 31 | 47 |
| Example | | | | |
| 5-1 | Stabilizer (11) | No. 2 | 80 | 95 |
| 5-2 | Stabilizer (6) | No. 5 | 85 | 100 |
| 5-3 | Stabilizer (10) | No. 7 | 75 | 95 |
| 5-4 | Stabilizer (2) | No. 9 | 90 | 105 |
| 5-5 | Stabilizer (1) | No. 11 | 80 | 90 |
| 5-6 | stabilizer (7) | No. 16 | 85 | 100 |
| 5-7 | Stabilizer (8) | No. 20 | 90 | 100 |
| 5-8 | Stabilizer (4) | No. 27 | 80 | 95 |
| Comparative Example | | | | |
| 5-6 | 2,6-Di-t-butyl-p-cresol | Octyldiphenyl phosphite | 45 | 60 |
| 5-7 | None | No. 28 | 33 | 48 |
| Example | | | | |
| 5-9 | Stabilizer (1) | No. 28 | 90 | 100 |
| 5-10 | Stabilizer (3) | No. 43 | 75 | 90 |
| 5-11 | Stabilizer (4) | No. 44 | 90 | 105 |
| 5-12 | Stabilizer (6) | No. 36 | 80 | 95 |
| 5-13 | Stabilizer (8) | No. 30 | 80 | 90 |
| 5-14 | Stabilizer (9) | No. 42 | 85 | 95 |
| 5-15 | Stabilizer (12) | No. 29 | 80 | 90 |

EXAMPLE 6

In order to demonstrate the effect of the compounds in accordance with this invention on an ethylene/vinyl acetate copolymer, samples were prepared in accordance with the following formulation.

| Compounding Formulation | parts by weight |
|---|---|
| Ethylene/Vinyl Acetate Copolymer (Melt flow index 1.4 g/10 min., 190° C., 2160 g JISK 6730 ethylene:vinylacetate = 86 wt:14 wt., produced by Toyo Soda Mfg. Co., Ltd.) | 100 |
| Montanic Acid-type Lubricant | 0.3 |
| Auxiliary Stabilizer (as shown in Table 7) | 0.1 |
| Phenol Compound (as shown in Table 7) | 0.05 |

The heat stability and initial coloration in a Geer oven at 175° C. of the samples were measured. The initial coloration was expressed by the degree of yellowing measured with a Hunter colorimeter.

The results obtained are shown in Table 7 below.

Table 7

| Run No. | Phenol Compound | Auxiliary Stabilizer | Heat Stability (min.) | Initial Coloration (%) |
|---|---|---|---|---|
| Comparative Example | | | | |
| 6-1 | None | No. 8 | 80 | 27 |
| 6-2 | Stabilizer (3) | None | 95 | 32 |

Table 7-continued

| Run No. | Phenol Compound | Auxiliary Stabilizer | Heat Stability (min.) | Initial Coloration (%) |
|---|---|---|---|---|
| Example |  |  |  |  |
| 6-1 | Stabilizer (7) | No. 3 | 135 | 9 |
| 6-2 | Stabilizer (11) | No. 8 | 140 | 10 |
| 6-3 | Stabilizer (3) | No. 15 | 130 | 9 |
| 6-4 | Stabilizer (5) | No. 19 | 140 | 10 |
| 6-5 | Stabilizer (4) | No. 22 | 145 | 9 |
| 6-6 | Stabilizer (9) | No. 26 | 135 | 11 |
| Comparative Example |  |  |  |  |
| 6-3 | None | No. 35 | 85 | 21 |
| Example |  |  |  |  |
| 6-7 | Stabilizer (2) | No. 48 | 125 | 11 |
| 6-8 | Stabilizer (3) | No. 35 | 140 | 9 |
| 6-9 | Stabilizer (5) | No. 46 | 140 | 10 |
| 6-10 | Stabilizer (7) | No. 27 | 150 | 9 |
| 6-11 | Stabilizer (10) | No. 40 | 130 | 11 |
| 6-12 | Stabilizer (11) | No. 28 | 120 | 12 |

EXAMPLE 7

The components below were injection-molded at 270° C. to prepare test samples.

|  | parts by weight |
|---|---|
| Polybutylene Terephthalate (Melting point 224° C., produced by Mitsubishi Chemical Industries, Ltd.) | 100 |
| Auxiliary Stabilizer (as shown in Table 8) | 0.2 |
| Phenol Compound (as shown in Table 8) | 0.2 |

Using each of these test samples, the ratio of residual tensile strength of the test sample after heat deterioration for 240 hours at 150° C. was measured. The results obtained are shown in Table 8 below.

Table 8

| Run No. | Phenol Compound | Auxiliary Stabilizer | Ratio of Residual Tensile Strength (%) |
|---|---|---|---|
| Comparative Example |  |  |  |
| 7-1 | None | None | 52 |
| 7-2 | 1,3,5-tris-(3',5'-Di-t-butyl-4-hydroxybenzyl)-2,4,6-trimethylbenzene | Dilauryl thiodipropionate | 63 |
| 7-3 | Stabilizer (3) | None | 61 |
| Example |  |  |  |
| 7-1 | Stabilizer (3) | No. 1 | 79 |
| 7-2 | Stabilizer (5) | No. 6 | 78 |
| 7-3 | Stabilizer (4) | No. 9 | 82 |
| 7-4 | Stabilizer (1) | No. 17 | 80 |
| 7-5 | Stabilizeer (12) | No. 21 | 77 |
| 7-6 | Stabilizer (10) | No. 25 | 80 |
| 7-7 | Stabilizer (1) | No. 45 | 79 |
| 7-8 | Stabilizer (3) | No. 27 | 81 |
| 7-9 | Stabilizer (6) | No. 44 | 76 |
| 7-10 | Stabilizer (8) | No. 35 | 80 |
| 7-11 | Stabilizer (9) | No. 29 | 79 |

EXAMPLE 8

It is known that conventional antioxidants are markedly consumed at the time of processing of resins at high temperatures by volatilization and other phenomena, and the degree of consumption greatly affects the properties of the resin. In this Example, this effect will be confirmed by repeated extrusion.

A resin and the additives were mixed for 5 minutes using a mixer in accordance with the following formulation. The mixture was extruded using an extruder (50 mmφ) to form a compound (cylinder temperature: 230° C., 240° C.; head die temperature: 250° C.; speed of rotation: 20 rpm). Extrusion was performed 5 times repeatedly. The compound was formed into test samples having a size of 95×40×1 mm using an injection-molding machine (cylinder temperature: 240° C.; nozzle temperature: 250° C.; injection pressure: 475 kg/cm$^2$). The resulting test pieces were placed in an oven at 160° C., and the time at which at least five of the ten test samples discolored was defined as the deterioration time.

For comparison, test samples were prepared in a similar manner from the compound obtained using only one extruding operation, and were evaluated in the same way. The results obtained are shown in Table 9 below.

| Compounding Formulation | parts by weight |
|---|---|
| Unstabilized Polypropylene (Melt flow index 4 g/10 min., 230° C., 2160 g, JISK 6758, produced by Hercules Powder Company) | 100 |
| Calcium Stearate | 0.2 |
| Dilauryl Thiodipropionate | 0.25 |
| Phenol Compound (as shown in Table 9) | 0.1 |
| Auxiliary Stabilizer (No. 27 in Table 1) | 0.05 |

Table 9

| Run No. | Phenol Compound | Deterioration Time (hours) Sample of Product Extruded Once | Sample of Product Extruded 5 Times |
|---|---|---|---|
| Comparative Example |  |  |  |
| 8-1 | 2,6-Di-t-butyl-p-cresol (no phosphite added) | 164 | 10 |
| 8-2 | 2,6-Di-t-butyl-p-cresol | 228 | 15 |
| 8-3 | Stearyl-(3,5-di-t-butyl-4-hydroxyphenyl)propionate | 297 | 154 |
| Example |  |  |  |
| 8-1 | Stabilizer (1) | 380 | 344 |
| 8-2 | Stabilizer (2) | 335 | 266 |
| 8-3 | Stabilizer (3) | 352 | 299 |
| 8-4 | Stabilizer (5) | 369 | 327 |
| 8-5 | Stabilizer (7) | 363 | 328 |

While the invention has been described in detail and with reference to specific embodiments thereof, it will be apparent to one skilled in the art that various changes and modifications can be made therein without departing from the spirit and scope thereof.

What we claim is:

1. A stabilized synthetic polymer composition comprising
   (1) 100 parts by weight of a synthetic polymer;
   (2) 0.001 to 5 parts by weight of a poly(alkylated alkenylphenol) composed substantially of monomeric units represented by the following formula (I)

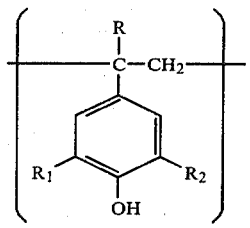

(I)

wherein R represents a hydrogen atom or an alkyl group having 1 to 4 carbon atoms; $R_1$ represents an alkyl group having 1 to 18 carbon atoms; and $R_2$ represents a hydrogen atom or an alkyl group having 1 to 18 carbon atoms; and (3) 0.001 to 5 parts by weight of an auxiliary stabilizer selected from the group consisting of a polyhydric alcohol ester of an alkylthioalkanoic acid, a polyester of a thiodipropionic acid, and an organic phosphite compound.

2. The composition of claim 1, wherein the synthetic polymer is a polymer of an ethylenically unsaturated monomer, a saturated or unsaturated polyester, a polyamide, a polycarbonate, a polyacetal, a polyurethane, a phenol resin, a urea resin, a melamine resin, an epoxy resin or a silicone resin.

3. The composition of claim 1, wherein the auxiliary stabilizer is selected from the group consisting of polyhydric alcohol esters of alkylthioalkanoic acids of the formula (II), polyesters of thiodipropionic acids of the formulae (III) and (IV) and organic phosphite compounds of the formulae (V) and (VI)

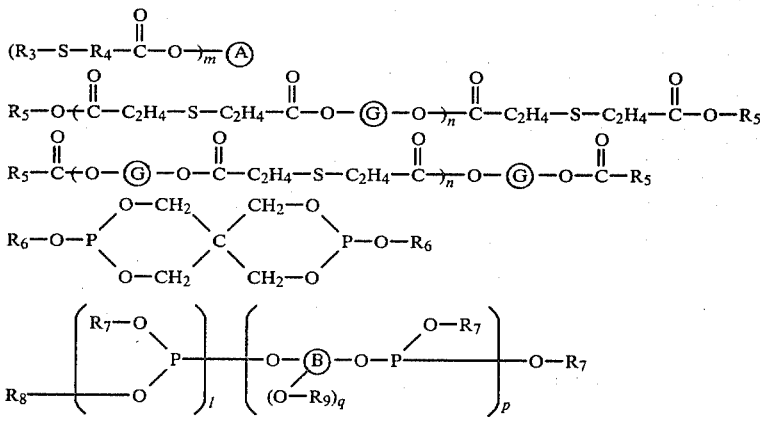

wherein $R_3$ represents an alkyl group having 1 to 30 carbon atoms; $R_4$ represents an alkylene group having 1 to 3 carbon atoms; m represents an integer of 2 to 6; Ⓐ represents a residue of a polyhydric alcohol having 2 to 6 hydroxyl groups; $R_5$ represents a hydrogen atom, an alkyl group having 1 to 18 carbon atoms, an aryl group, an alkylaryl group, an arylalkyl group or an alkylthioalkyl group; Ⓖ represents a residue of a dihydric alcohol; n represents 1 to 20; $R_6$ represents an alkyl group having 1 to 18 carbon atoms, an aryl group, an alkylaryl group, an arylalkyl group, a residue of an ethylene glycol monoether, a residue of a diethylene glycol monoether, a polyhydric phenol residue with at least one unesterified hydroxyl group, a polyhydric phenol residue with at least one unesterified hydroxyl group of which one hydroxyl group is in the form of a phosphite ester, a polyhydric alcohol residue with at least one unesterified hydroxyl group, a polyhydric alcohol residue with at least one unesterified hydroxyl group of which one hydroxyl group is in the form of a phosphite ester, $R_7$ represents an alkyl group having 1 to 18 carbon atoms, an aryl group, an alkylaryl group, an arylalkyl group, a residue of an ethylene glycol monoether, a residue of a diethylene glycol monoether, a polyhydric phenol residue with at least one unesterified hydroxyl group, or a polyhydric alcohol residue with at least one unesterified hydroxyl group; $R_8$ represents the groups as defined above for $R_7$ and additionally a hydrogen atom; $R_9$ represents a hydrogen atom or a

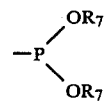

group; Ⓑ represents a residue of a polyhydric alcohol having 2 to 6 hydroxyl groups or a residue of a polyhydric phenol having 2 to 6 hydroxyl groups; l represents 0 or 1; p represents 1 to 10; and q represents 0 to 4.

4. The composition of claim 2, wherein the polymer of an ethylenically unsaturated monomer is polyethylene, polypropylene, polybutene, an acrylonitrile/butadiene/styrene resin, polyvinyl chloride, isoprene rubber, butadiene rubber, butadiene copolymer or an ethylene/vinyl acetate copolymer.

5. The composition of claim 2, wherein the polyester is polybutylene terephthalate.

6. The composition of claim 1, wherein the poly(alkylated alkenylphenol) is poly(tertiary-butylated p-vinylphenol).

7. The composition of claim 1, wherein the poly(alkylated alkenylphenol) is poly(tertiary butylated p-isopropenylphenol).

8. The composition of claim 1, wherein the poly(alkylated alkenylphenol) is poly(propylated p-vinylphenol).

9. The composition of claim 1, wherein the poly(alkylated alkenylphenol) is poly(tertiary butylated 2-methyl-p-vinylphenol).

10. The composition of claim 3, wherein the polyhydric alcohol ester of an alkylthioalkanoic acid is a compound of the formula:

11. The composition of claim 3, wherein the polyhydric alcohol ester of an alkylthioalkanoic acid is a compound of the formula:

12. The composition of claim 3, wherein the polyester of a thiodipropionic acid is a compound of the following formula:

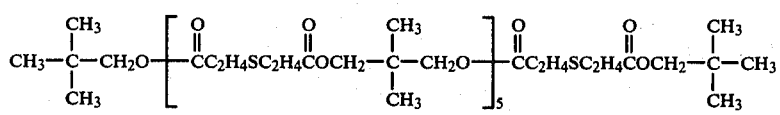

13. The composition of claim 3, wherein the polyester of a thiodipropionic acid is a compound of the following formula:

14. The composition of claim 3, wherein the polyester of a thiodipropionic acid is a compound of the following formula:

15. The composition of claim 3, wherein the organic phosphite compound is a compound of the following formula:

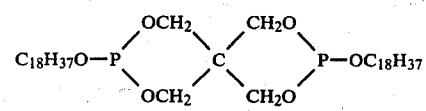

16. The composition of claim 3, wherein the organic phosphite compound is a compound of the following formula:

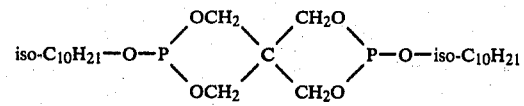

17. The composition of claim 3, wherein the organic phosphite compound is a compound of the formula:

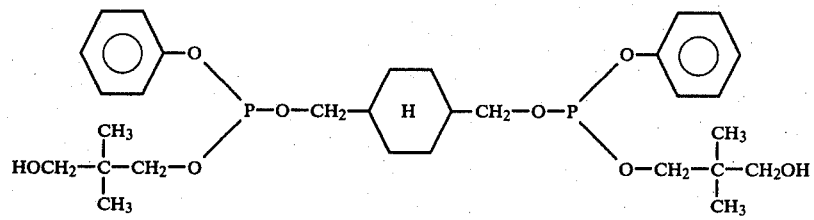

18. The composition of claim 3, wherein the organic phosphite compound is a compound of the formula:

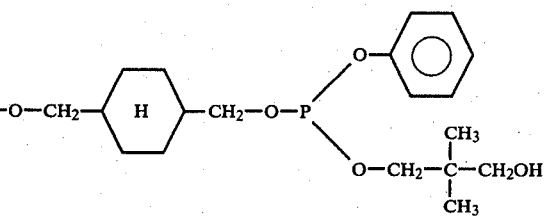

19. The composition of claim 3, wherein the organic phosphite compound is a compound of the formula:

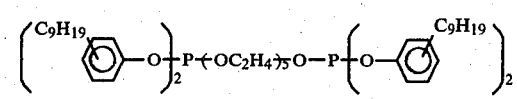

20. The composition of claim 3, wherein the polyhydric alcohol ester of an alkylthioalkanoic acid is a compound of the formula:

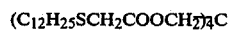

21. The composition of claim 3, wherein the polyhydric alcohol ester of an alkylthioalkanoic acid is a compound of the formula:

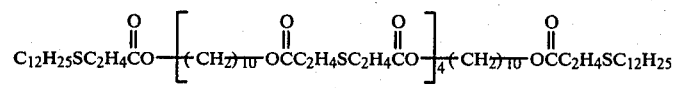

22. The composition of claim 3, wherein the organic phosphite compound is a compound of the formula:

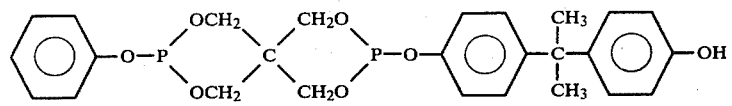

23. The composition of claim 3, wherein the organic phosphite compound is a compound of the formula:

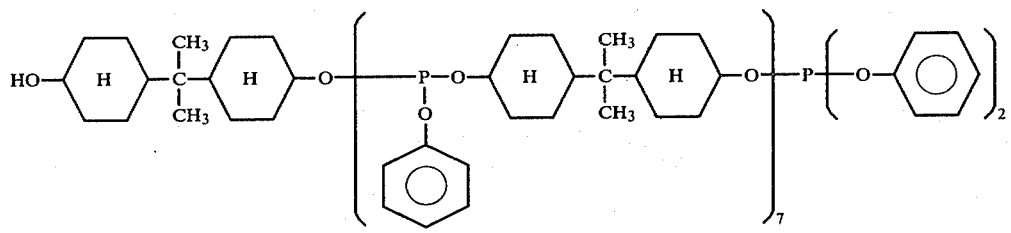

24. The composition of claim 3, wherein the organic phosphite compound is a compound of the formula:

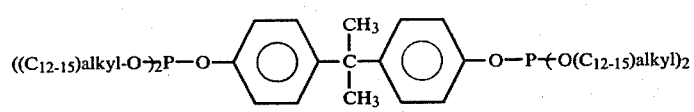

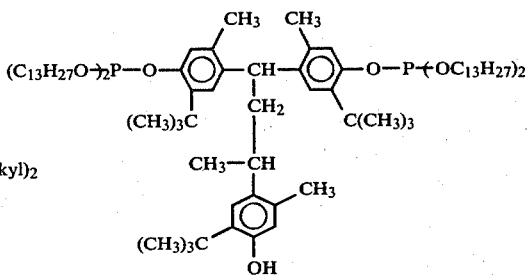

25. The composition of claim 3, wherein the organic phosphite compound is a compound of the formula:

26. The composition of claim 3, wherein the organic phosphite compound is a compound of the formula:

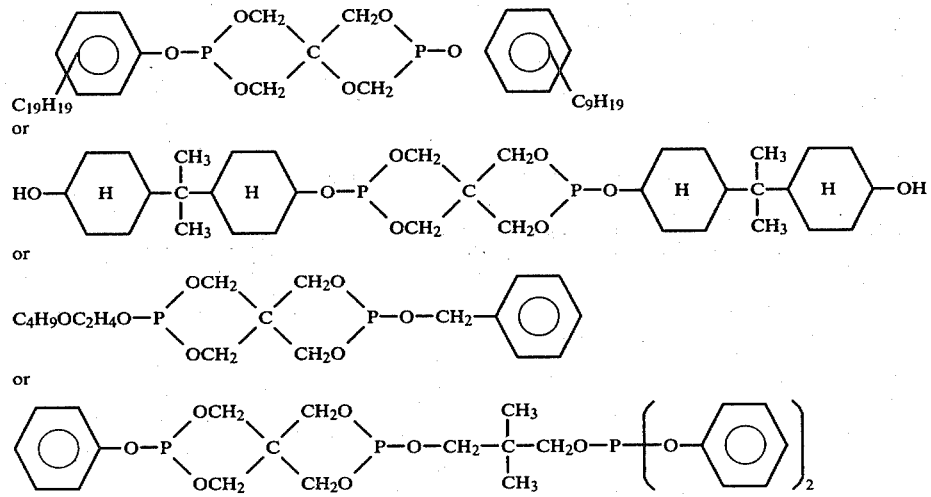

* * * * *